(12) United States Patent
Eich (10) Patent No.: US 8,235,425 B2
(45) Date of Patent: Aug. 7, 2012

(54) LEVER ARM COUPLING FOR CONNECTING HOSE LINES

(76) Inventor: Dieter Eich, Reiden/LU (CH)

( * ) Notice: Subject to any disclaimer, the term of this patent is extended or adjusted under 35 U.S.C. 154(b) by 0 days.

(21) Appl. No.: 13/001,082

(22) PCT Filed: Jun. 24, 2009

(86) PCT No.: PCT/EP2009/057716
§ 371 (c)(1),
(2), (4) Date: Dec. 23, 2010

(87) PCT Pub. No.: WO2009/156357
PCT Pub. Date: Dec. 30, 2009

(65) Prior Publication Data
US 2011/0095525 A1    Apr. 28, 2011

(30) Foreign Application Priority Data
Jun. 27, 2008    (CH) ........................... 0997/08

(51) Int. Cl.
*F16L 35/00* (2006.01)
(52) U.S. Cl. ................ 285/87; 285/1; 285/312
(58) Field of Classification Search ........... 285/1, 83, 285/87, 81, 88, 312
See application file for complete search history.

(56) References Cited

U.S. PATENT DOCUMENTS

| | | | |
|---|---|---|---|
| 3,439,942 A * | 4/1969 | Moore et al. | 285/312 |
| 4,519,635 A | 5/1985 | McMath | |
| 4,802,694 A | 2/1989 | Vargo | |
| 5,295,717 A | 3/1994 | Chen | |
| 5,791,694 A * | 8/1998 | Fahl et al. | 285/312 |
| 5,904,380 A * | 5/1999 | Lee | 285/312 |
| 5,911,445 A * | 6/1999 | Lee | 285/312 |
| 6,053,540 A * | 4/2000 | Meyer | 285/312 |
| 6,447,016 B2 * | 9/2002 | Collier | 285/81 |
| 7,543,857 B2 * | 6/2009 | Dole | 285/312 |

FOREIGN PATENT DOCUMENTS

| | | |
|---|---|---|
| DE | 29707456 U1 | 6/1997 |
| EP | 0615090 A1 | 9/1994 |

OTHER PUBLICATIONS

International Search Report published Dec. 30, 2009 for PCT/EP2009/057716 filed Jun. 24, 2009.
International Preliminary Report on Patentability published Jan. 5, 2011 for PCT/EP2009/057716 filed Jun. 24, 2009.
Written Opinion of the International Searching Authority published Dec. 27, 2010 for PCT/EP2009/057716 filed Jun. 24, 2009.

* cited by examiner

*Primary Examiner* — David E Bochna
(74) *Attorney, Agent, or Firm* — Martin Fleit; Paul D. Bianco; Fleit Gibbons Gutman Bongini & Bianco PL (57) ABSTRACT

A lever arm coupling for detachably connecting hose lines has a first connection part and a second connection part, the coupling operable by way of at least one lever arm. The lever arm comprises a pressure application section that is mounted pivotably about a pivot bolt that defines a pivot axis, the pressure application section reaching through a radial opening into a receptacle space of a receptacle housing. A securing disk is pivotably disposed on the pivot bolt parallel to the pressure application section. The securing disk is mounted pivotably between stops at the second connection part and can be carried along with the lever arm, wherein a pivoting of the securing disk can be executed in such a way that a secured pressure release position of the lever arm coupling is attained.

12 Claims, 7 Drawing Sheets

LEVER ARM COUPLING FOR CONNECTING HOSE LINES

TECHNICAL FIELD

The instant invention relates to a lever arm coupling for detachably connecting hose lines, comprising a first connection part and a second connection part, wherein the second connection part encompasses a receptacle housing comprising a receptacle space, on which at least one lever arm is supported so as to be moved pivotably about a pivot bolt, which defines a pivot axis, with a pressure application section reaching through a radial opening of a housing wall, so that the lever arm can be brought from a locking position via a pressure release position into a release position and back, wherein the pressure application section positionally fixes a front side of the first connection part in the locking position or releases it in the pressure release position and in the release position, respectively.

STATE OF THE ART

Lever arm constructions for detachably connecting hose lines, in which liquids, solid materials and gases are conveyed, are known in the technology.

A first connection part, which is connected to a first line, is detachably attached in a receptacle housing, wherein a second line is connected to the second connection part. At least one lever arm, which engages with a pressure application section through a radial opening in the receptacle housing, allows for the fixation of the first connection part within the receptacle housing of the second connection part in an unlocking position. The pressure application section of the lever arm engages with a pressure surface into a peripheral groove on the first connection part in a clamping manner. Typically, provision is made for two lever arms, which are pivotably supported on opposite sides of the receptacle housing so as to engage with a receptacle space of the receptacle housing.

The known lever arm couplings release the first connection part from the second connection part into a release position of the lever arms. A liquid-tight connection of the first connection part and of the second connection part is attained in the locking position, so that the lever arm coupling connects the first hose line and the second hose line so as to form a seal in a pressure range of up to 10 bar.

In the past, the attainable tightness of the lever arm coupling as well as the operating safety of the lever arms was improved. EP0615090 describes a device, which attains the securing of the position of the lever arms in the locking position, wherein an unintentional activation of the lever arms is made impossible. An accidental, unintentional complete separation of the coupling parts of the lever arm coupling is made impossible by means of this device, so that accidents with pressurized lever arm couplings can be avoided.

EP 0615090 discloses a lever arm coupling, which encompasses a two-stage locking process, wherein the lever arm coupling can be brought from a release position, in which the first connection part can be inserted into and removed from the receptacle housing, into a locking position. However, an uncontrolled escape of the excess pressure and a deflection of the lever arms can take place in response to the disengagement of a pressurized connection of the first hose line and of the second hose line, as soon as the clamping connection between the pressure surface of the lever arm and a clamping side of the peripheral groove has been disengaged. The first connection part is pressed out of the receptacle housing and the conveyed liquid or the gas escapes suddenly due to the excess pressure in the first and second hose line. The lever arms are moved suddenly into the release position by means of the relative movement of the first connection part to the second connection part, which can lead to injuries to the operating personnel and to the destruction of the lever arm coupling. The closing accuracy and the tightness of the lever arm coupling deteriorate during operating when the lever arms deflect in response to a repeated decoupling.

In the first step of the disengagement of the two connection parts, the current solutions have the effect that a rubber seal located therebetween is displaced and that pressure relief or ventilation does not take place at all. In response to the complete separation, the pressure is thus still present and the two parts shoot away from one another with a corresponding risk of injury.

Lever arm couplings of the state of the art encompass a locking position, in which a first connection part is detachably connected to a second connection part so as to form a seal. The separation of the first and second connection part takes place in a release position, in which the first connection part can be removed from the receptacle housing of the second connection part in the direction of the longitudinal axis of the insertion section. Lever arm couplings comprising a two-stage locking process have the above-mentioned disadvantages.

ILLUSTRATION OF THE INVENTION

It is the object of the instant invention to create a lever arm coupling, which ensures a controlled position change of the lever arms and a controlled pressure release or ventilation during the unlocking process of the lever arm coupling in the case of a connection of a first connection part to a second connection part, with said connection being pressurized.

A lever arm coupling comprising the features of patent claim 1 fulfills this object and additionally the prevention of an undesired displacement of the lever arms as well as the guarantee that a pressure release or a ventilation takes place.

Further advantageous embodiments are disclosed in the dependent claims.

BRIEF DESCRIPTION OF THE DRAWINGS

A preferred exemplary embodiment of the object of the invention will be described below in context with the appended drawings.

FIG. 5 shows a top view onto a securing disk.

FIG. 6a shows a top view onto a lever arm, while

FIG. 7a shows a section of a further embodiment of a second connection part in the form of a sealing plug, while FIG. 7b shows a pure sectional illustration of the connection part according to FIG. 7a, which is rotated by 90°.

DESCRIPTION

Figure 1:
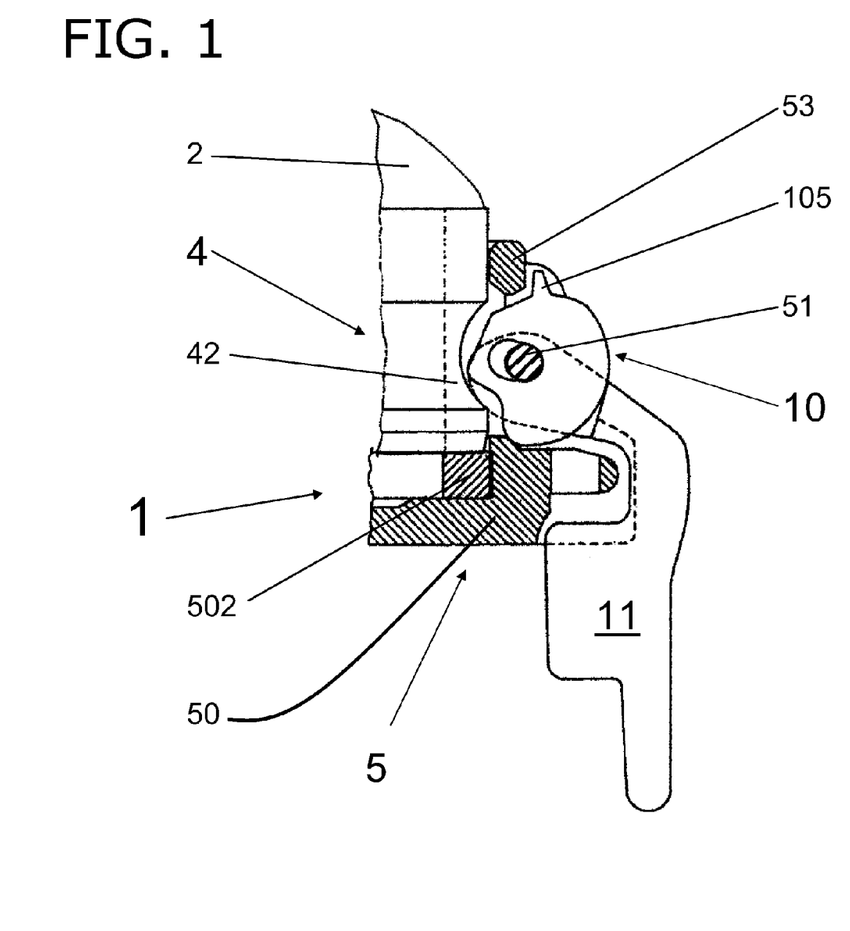
FIG. 1 shows a top view onto a section of a lever arm coupling according to the invention in locking position, wherein one half of a receptacle housing of a second connection part comprising a lever arm is illustrated in a partially sectional view.

A part of a lever arm coupling 1, which couples a first connection part 4 of a first hose line 2 to a second connection part 5 is shown in FIG. 1. The second connection part 5 illustrated herein encompasses a receptacle housing 50 comprising a ring-shaped housing wall 501, in the receptacle space 500 of which the first connection part 4 can be inserted with an insertion section 40. The insertion section 40 encompasses a peripheral groove 42, which is defined by a rear side 41 and a front side 43. The first connection part 4 is detachably connected to the second connection part 5 by means of a sealing ring 502 in a liquid and gas-tight manner.

The invention is defined herein using the example of a second connection part 5 in the manner of a sealing plug, wherein it is naturally also possible for a further hose line to be connected to the second connection part 5.

The lever arm 11 encompasses a cylindrical hole 111 in a pressure application section 112. A pivot bolt 51, which is integrally molded on the receptacle housing 50 or which is attached thereto so as to be capable of being detached, engages through the cylindrical hole 111, whereby the lever arm 11 is operatively attached to the second connection part 5 and thus to the receptacle housing 50 in the area of the pressure application section 112 so as to engage with the housing wall 501 through a radial opening 52. The lever arm 11 can be pivoted about a pivot axis, which runs through the pivot bolt 51, relative to the receptacle housing 50. The pressure application section 112, which engages through the radial opening 52 in the receptacle housing 50, encompasses a pressure surface 114, which can be operatively connected to a front side 43 of the insertion section 40.

In a locking position of the lever arm 11, the pressure application section 112 engages with the peripheral groove 42 of the first connection part 4, which is inserted into the receptacle housing 50. Pressed onto the front side 43, the pressure surface 114 can thereby be clamped, whereby a detachable positive liquid-tight and/or gas-right connection of the first connection part 4 is attained in the receptacle housing 50 of the second connection part 5. In the locking position, a linear movement of the first connection part 4 relative to the second connection part 5 is thus made impossible. Provision is made for a locking stop 55 for defining the movement of the lever arm 11 in the locking position on the second connection part 5.

From the locking position, the lever arm 11 can be brought into a release position, in which the first connection part can be detached from the second connection part 4, 5. A pressure release or ventilation of the first hose line 2 takes place in response to the movement of the lever arm 11 into the release position, because the liquid and/or gas-tight connection between the first connection part 4 and the second connection part 5 is separated. The instant patent application generally refers to pressure release, which represents a ventilation, for example, when gaseous media are used. The release position and a pressure release or ventilation connected thereto can take place as soon as a release point 116 located on the pressure application section 112 releases the first connection part 4. The shape of the pressure application section 112 and the positioning of the release point 116 determine at which deflection of the lever arm 11 a pressure release or ventilation can take place.

In the release position, the lever arm 11 is oriented such that the pressure surface 114 of the pressure application section 112 is not engaged with or in contact with the peripheral groove 42 or with another part of the insertion section 40, which is embodied in a tapered manner. The maximum deflection of the lever arm 11 is defined by a release stop 53 on the second connection part 5, which can be seen in FIG. 4.

When the lever arm 11 and thus the pressure application section 112 is moved from the locking position in the direction of the release position, the pressure surface 114 releases the first connection part 4 within the receptacle housing 50, starting at the release point 116, so that the insertion section 40 can be removed from the receptacle housing 50.

To avoid an uncontrollable pressure release or ventilation and an unintentional linear movement of the first connection part 4 out of the receptacle housing 50, a securing disk 10 is initially supported in a movable manner on the pivot bolt 51 in an approximately parallel direction to the pressure application section 112 of the lever arm 11. This securing disk 10 can be pivoted independent on the lever arm 11. A recess 115 comprising a recess surface 117, which interacts with the securing disk 10, is recessed at the lever arm 11.

Figures 5, 6A:
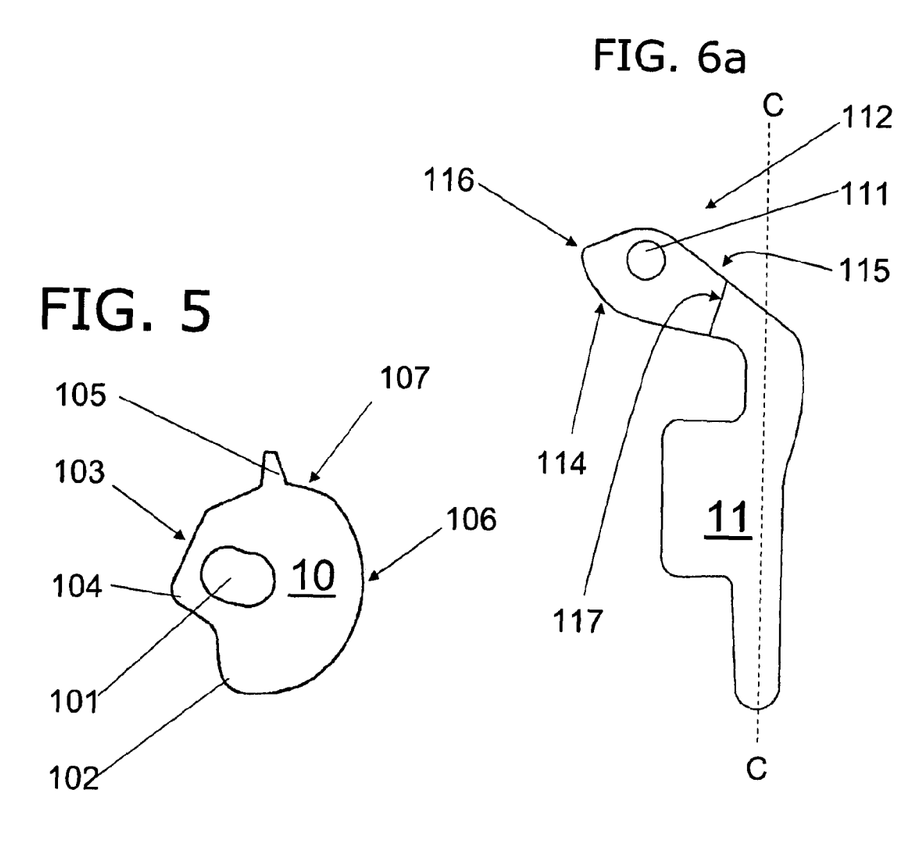
Figure 6B:
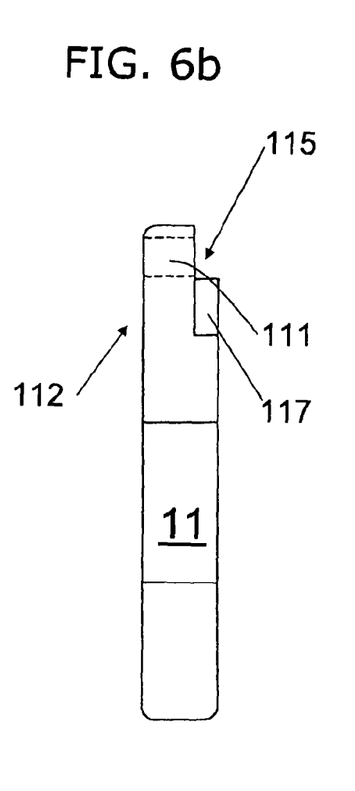
FIG. 6b shows a side view of a lever arm.

The securing disk 10 crosses an elongated hole 101. The outer shape of the elongated hole 101 illustrated herein of a preferred embodiment of the securing disk 10 encompasses a curved course, wherein a linear shape would also be possible. A detention cam 104 is embodied such that this detention cam 104 is embodied so as to be able to project into the peripheral groove 42 when the securing disk 10 is supported on the pivot bolt 51. In addition to the detention cam 104, which interacts with the front side 43, a defining cam 102 and a carry-along cam 105 are also integrally molded on the securing disk 10.

In the locking position according to FIG. 1, the pressure surface 114 holds the front side 43 of the first connection part 4, while the detention cam 104 projects into the peripheral groove 42 without an effect and without touching the first connection part 4.

Figure 2:
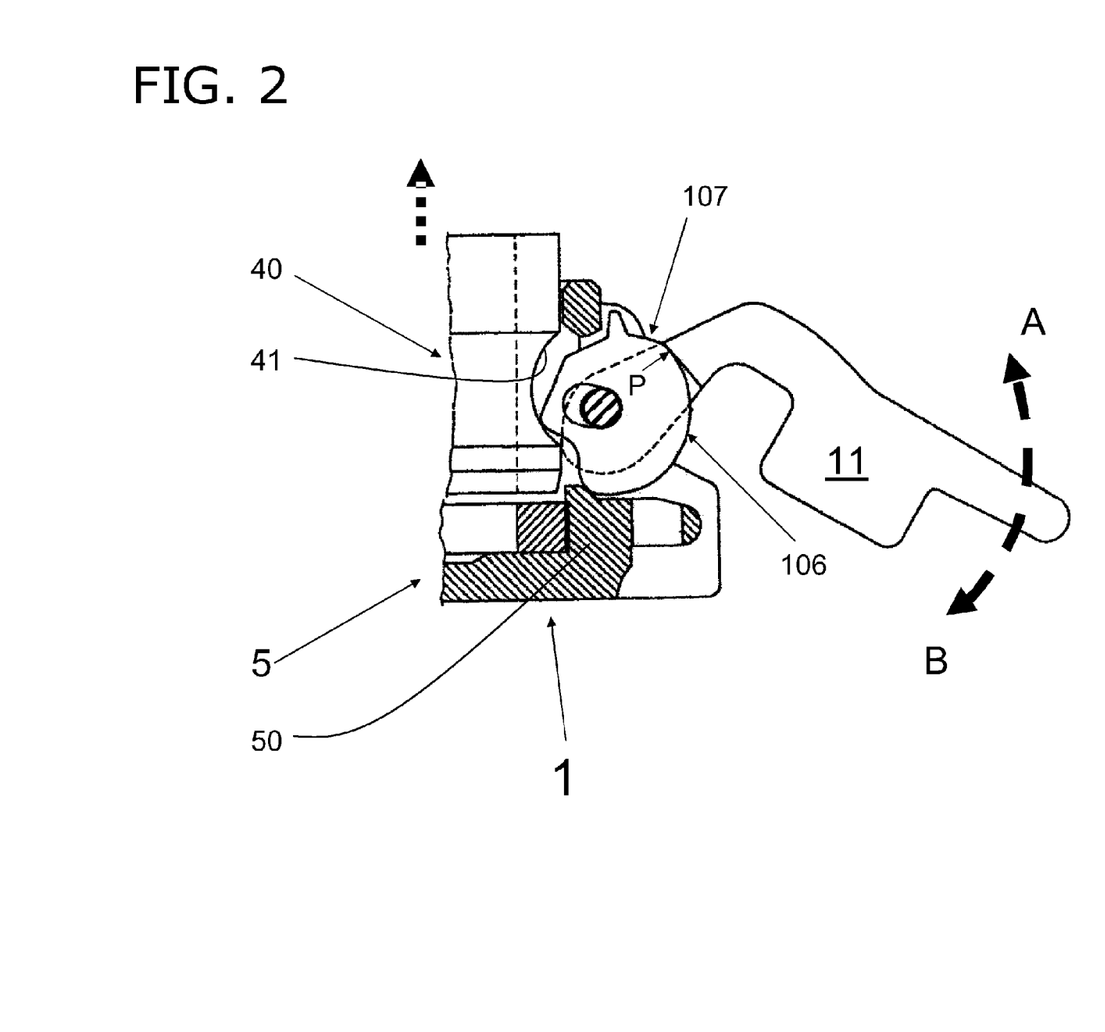
FIG. 2 shows a top view according to FIG. 1, wherein the illustrated lever arm coupling is in a pressure release/ventilation position or in a still sealing position.

In the event that the lever arm 11 is moved out of the locking position, the pressure surface 114 looses the contact to the front side 43, so that the first connection part 4 is released and can be moved linearly out of the receptacle housing 50. As can be seen in FIG. 2, the detention cam 104 engages with the peripheral groove 42 and touches the front side 43.

Due to the linear movement of the first connection part 4 out of the receptacle housing 50, the securing disk 10 is pivoted about the pivot axis by means of the contact of the detention cam 104 with the front side 43 in the clockwise direction into a first direction B until the defining cam 102 strikes a pressure release stop 54 on the second connection part 5.

A force P, which is caught by the recess surface 117 by means of the positive contact with the outer contour 106, acts on the securing disk 10, so that no forces act on the lever arm 11 in a second direction A in counter-clockwise direction or in the direction B in clockwise direction and so that the lever arm 11 is thus not unintentionally moved in the directions A or B in response to the pressure release or ventilation. The securing disk 10 cannot be rotated in clockwise direction A according to FIG. 2, because the outer contour 106 cannot be guided along the recess surface 117 and because the defining cam 102 is held by the pressure release stop 54. The securing disk 10 is supported by the recess surface 117. A ventilation or a pressure release or a pressure maintaining, respectively, can take place for the first time in the position illustrated in FIG. 2.

Figure 3:
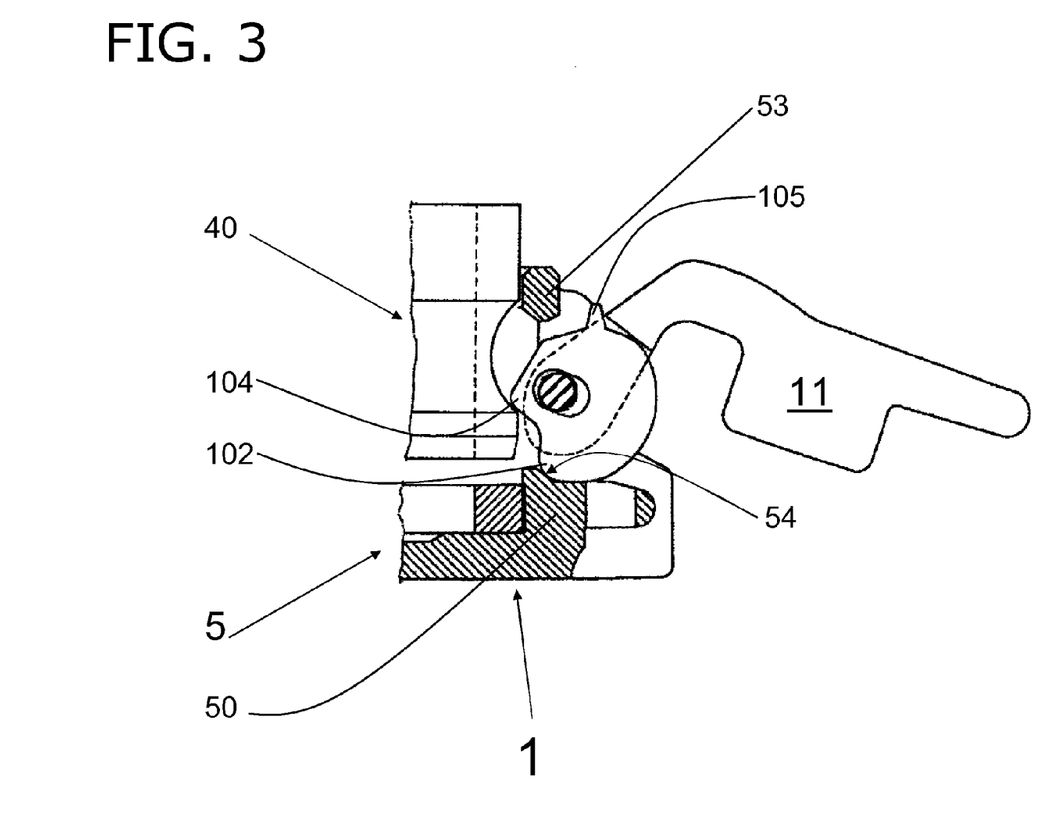
FIG. 3 shows a top view according to FIG. 2, wherein the illustrated lever arm is in a release position and a detention cam of a securing disk engages with a clamping side of the peripheral groove.

The force P impedes the movement of the securing disk 10 such that the securing disk 10 can only be rotated minimally in clockwise direction. In response to an upward pivoting of the lever arm 11 in the direction A according to FIG. 2, the recess surface 117 of the pressure application section 112 moves across a flat area 107, which follows the outer contour 106 of the securing disk 10. The securing disk 10 is then no longer connected to the recess surface 117 in a positive manner, so that a linear displacement of the securing disk 10 occurs, as can be seen in FIG. 3.

The carry-along cam 105 prevents the unintentional rotation of the securing disk 10 in counter-clockwise direction into the receptacle housing 50, in that the carry-along cam 105 strikes against the release stop 53. The carry-along cam 105 also prevents an uncontrolled rotation of the securing disk 10 in clockwise direction, because the carry-along cam 105 strikes against the recess surface 117 on the lever arm 11.

In response to a small pivoting of the lever arm 11 in counter-clockwise direction, the securing disk 10 can be moved out of the receptacle housing 50, determined by the embodiment of the elongated hole 101 away from the longitudinal axis of the receptacle housing 50.

In this secured pressure release position, the linear movement of the first connection part 4 out of the receptacle housing 50 is made impossible by the interaction of the detention cam 104 on the front side 43 so as to press thereon, by the interaction of the defining cam 102 with the pressure release stop 54 and the stop of the carry-along cam 105 on the lever arm 11.

The first connection part 4 cannot carry out a linear movement approximately parallel to the longitudinal axis of the first connection part 4. The interaction of the detention cam 104 with the front side 43 of the peripheral groove 42 makes an unintentional movement impossible and a displacement of the lever arms 11 does not take place in response to the ventilation.

Figure 4:
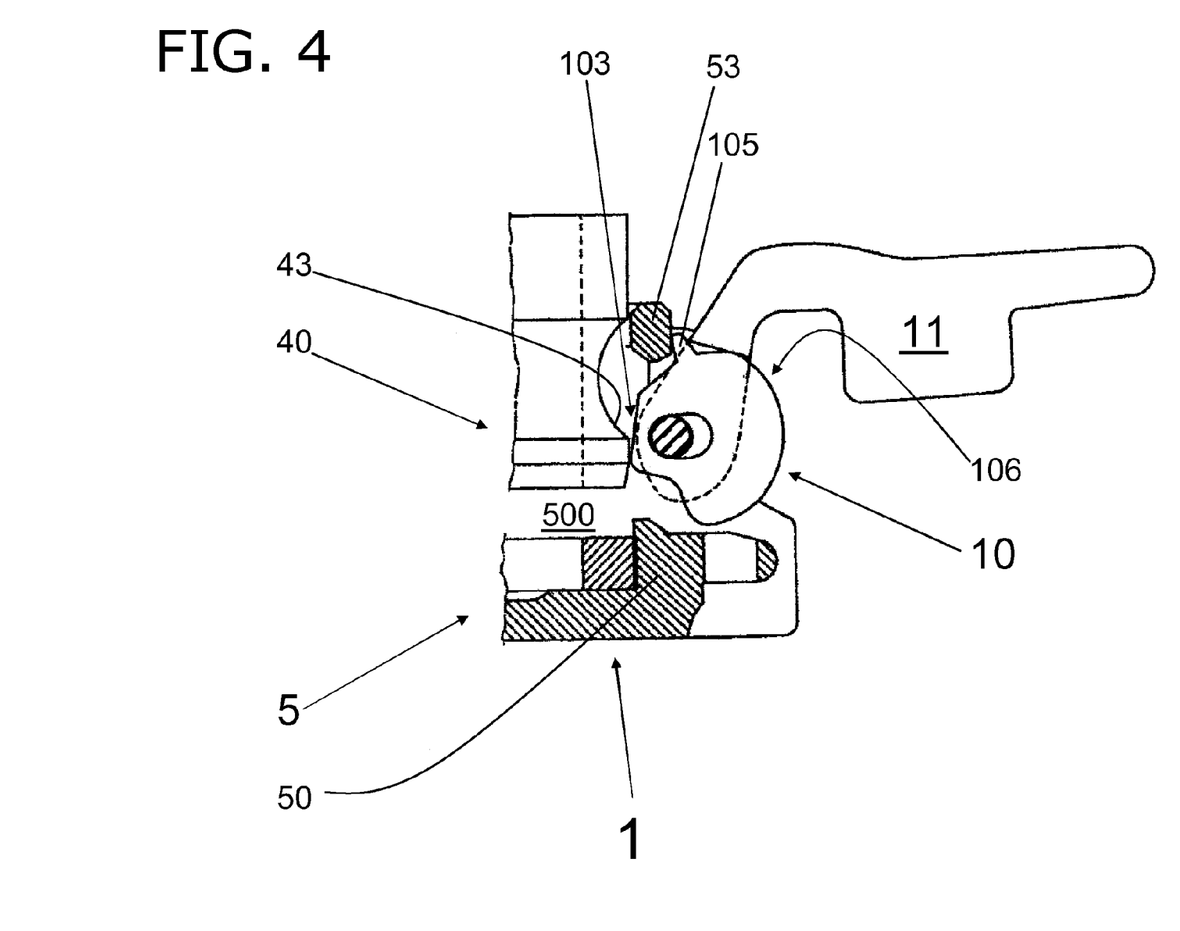
FIG. 4 shows a top view according to FIG. 3, wherein the illustrated lever arm is in a release position and the pressure application section as well as the securing disk releases the first connection part.

To dissolve the secured, pressure-released position, the lever arm 11 is further pivoted in counter-clockwise direction, as is illustrate din FIG. 4. The lever arm 11 carries along the securing disk 10 in response to the pivoting movement in counter-clockwise direction.

The recess 115 integrally molded on the pressure application section 112 carries along the carry-along cam 105 and thus the securing disk 10 and the securing disk is pivoted about the pivot axis such that the detention cam 104 releases the front side 43 of the peripheral groove 42. A release surface 103 of the securing disk 10 faces the first connection part 4. The release surface 103 is thereby located approximately parallel to the outer surface of the first connection part 4 and the first connection part 4 can thus be removed from the receptacle housing 50.

In response to the pivot movement into the release position, the pressure application section 112 of the lever arm 11 carries along the carry-along cam 105 of the securing disk 10 until the carry-along cam 105 abuts on the release stop 53. So that the securing disk 10 can be guided from the secured pressure release position into the release position by means of the carry-along cam 105, the design of the outer contour 106 of the securing disk 10 must be embodied such that the recess surface 117 of the recess 115 of the pressure application section 112 can move across the outer contour 106.

A fixation of the lever arm 11 in the locking position can be reached as in EP0615090, for example, wherein securing pins comprising corresponding tension elements, which are supported in a resilient manner, can be inserted into the lever arms 11. These securing pins can be inserted into recesses on the second connection part, which are provided for this purpose, and can be secured at that location, whereby an unintentional opening of the lever arms 11 is made impossible.

Lever arm couplings according to the state of the art, which do not comprise the securing disk 10 described herein, encompass a sudden and uncontrollable movement of the lever arm from the locking position to the release position when the first hose pipe 2 encompasses an excess pressure. The lever arm coupling 1 illustrated herein, which encompasses a secured pressure release or pressure maintaining position between a locking position and a release position, prevents a sudden unintentional pressure release or ventilation.

FIG. 3 illustrates the secured pressure release or pressure maintaining position of the lever arm 11 or of the first connection part 4, respectively, within the receptacle housing 50 of the second connection part 5. By the interaction of the detention cam 104 with the front side 43 of the insertion section 40, the securing disk 10 is oriented by means of a pivot movement relative to the pivot bolt 51 such that the defining cam 102 strikes the pressure release stop 54, wherein the force P presses the outer contour 106 against the recess surface 117 and the securing disk 10 is thus fixed so as to engage with the peripheral groove 42 in a wedged manner.

When pressure is applied to the first hose line 2 or a non-illustrated second hose line, the first connection part 4 is pressed out of the receptacle housing 50 linearly by means of the excess pressure.

Due to the interaction of the detention cam 104 with the front side 43, the securing disk 10 is pivoted minimally in counter-clockwise direction and is pressed linearly against the recess surface 117 by means of the force P.

Tests have shown that a pressure release or ventilation does not necessarily take place in response to the transition into the pressure release position, because the flexible sealing ring 502 still remains in a sealing contact with the first connection part 4. The sealing rings 502 are made from synthetic materials and are embodied in a flexible manner, wherein the sealing rings 502 must be resistant against chemicals, depending on the field of application of the lever arm coupling 1, and must withstand the maximally occurring pressures.

Figures 7A, 7B:
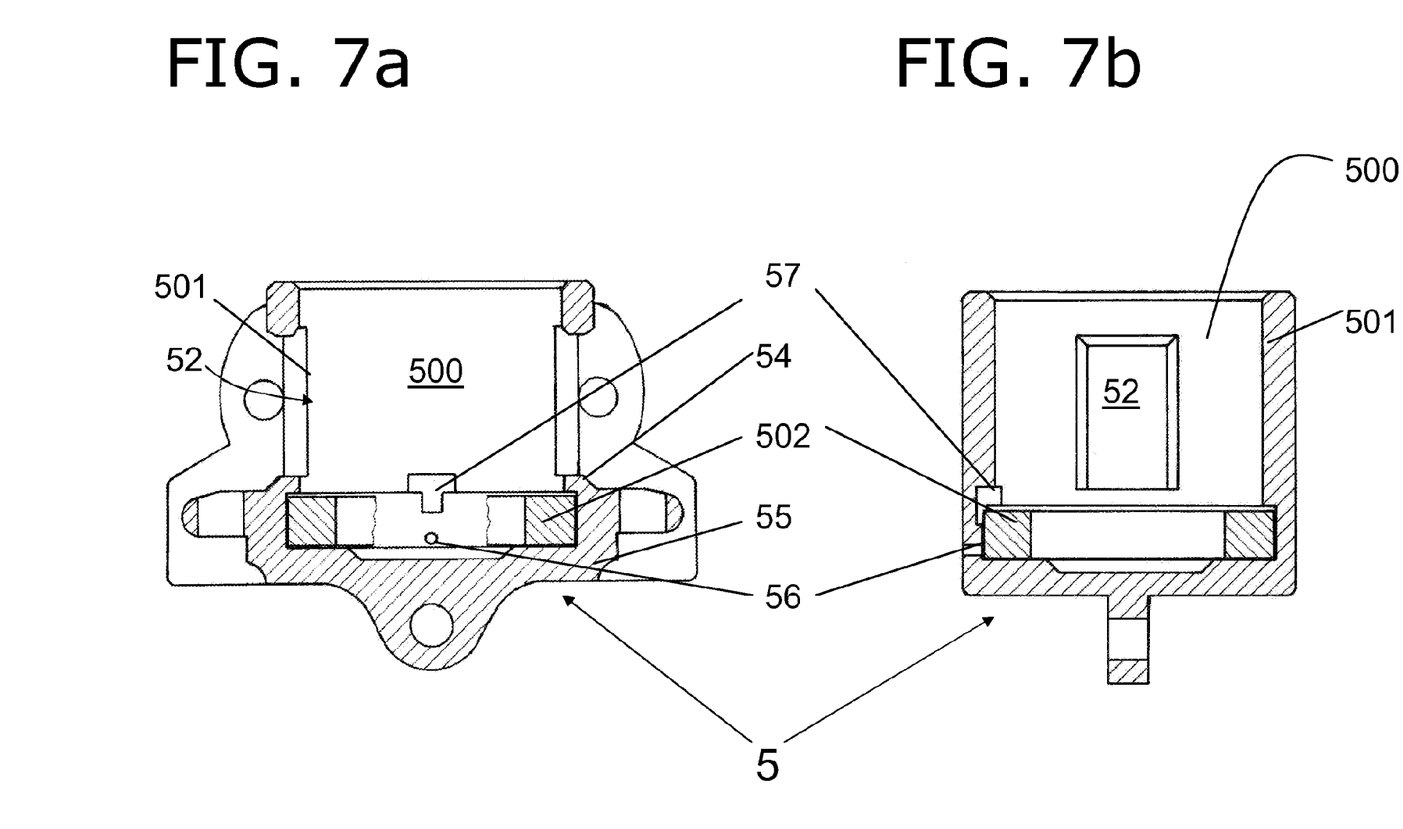

To ensure a pressure release or ventilation of the lever arm coupling 1 in response to the transition into the secured pressure release position, at least one pressure release hole 56 and/or at least one pressure release pocket 57 can be optionally installed in the housing wall 501, as is illustrated in FIGS. 7a and 7b.

The pressure release hole 56 can be arranged in the area of the sealing ring 502 so as to permeate the housing wall 501. In the figures, an exemplary pressure release hole 56 is arranged so as to radially point to the ring-shaped housing wall 501. A different orientation of the pressure release hole 56, for example approximately parallel to the longitudinal axis of the receptacle housing 50, is possible, wherein the sealing ring 502 closes the pressure release hole 56 so as to form a seal in response to the connection of the first connection part 4 to the second connection part 5.

The pressure release pocket 57 can be introduced into the edge of the housing wall 501 in any orientation, wherein the sealing ring 502 allows for a liquid and gas-tight connection in response to the connection of the first connection part to the second connection part 4, 5. The pressure release pocket 57 recessed in the housing wall 501 can be recessed directly in response to the production of the receptacle housing 50 or can be milled out, for example, in a retroactive processing of the receptacle housing 50 in the edge area of the interior of the receptacle housing 50.

When the lever arm coupling 1 is brought into the secured pressure release position, the sealing ring 502 can be moved and can tilt in the direction of the first connection part 4, wherein liquid or gas can escape from the first hose line 2 after passing through the pressure release hole 56 and/or the milled pressure release pocket 57. In the case of the pressure release hole 56, gas or liquid can escape from the pressure release hole out of the receptacle housing 50 towards the outside, whereby the pressure release or ventilation is guaranteed. In the case of the pressure release pocket 57, which is milled into the housing wall 501, gas or liquid can escape out of the second connection part 5 at the housing wall 501 within the receptacle housing 50 past the first connection part 4.

Test series have shown that the recess 115 is to preferably encompass a recess surface 117, which runs beveled relative to the elongated hole 101. The recess surface 117 should not be oriented parallel to the longitudinal axis C-C suggested in FIG. 6a. An advantageous jamming of the securing disk 10 can thus be reached in the recess 115 and the outer contour 106 can still move across the recess surface 117 and a release of the securing disk 10 is possible as soon as the flat area 107 is guided past the recess surface 117.

Figure 8:
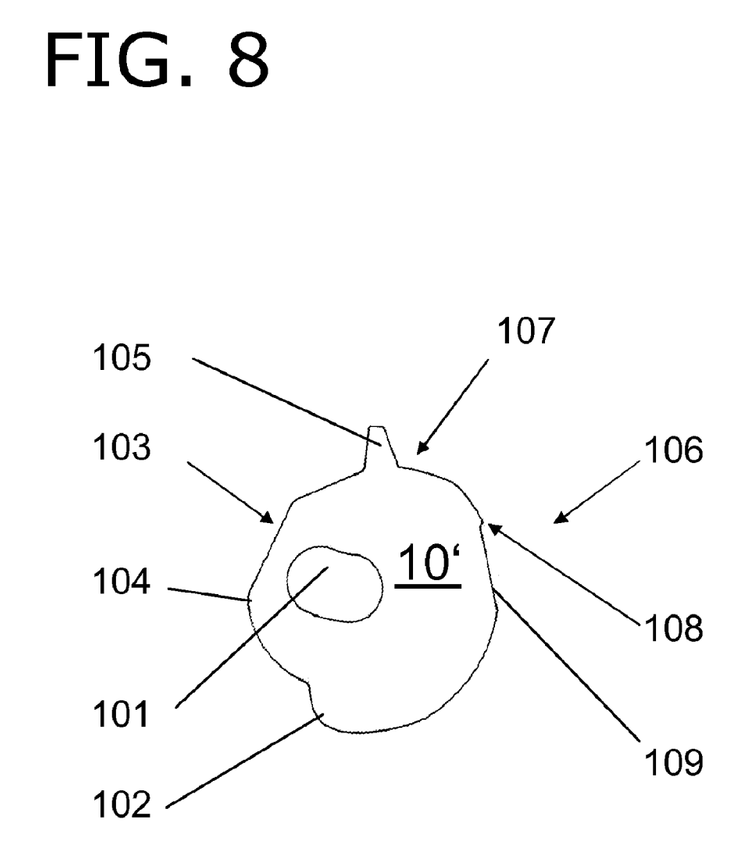
FIG. 8 shows a top view onto a further embodiment of the securing disk.

A further embodiment of a securing disk 10', which prevents a sudden movement of the lever arm from the locking position to the release position in response to an excess pressure in the first hose line 2, is illustrated in FIG. 8.

In addition to the features described above, the securing disk 10' encompasses a plane surface 109 and a projection 108, which abuts on the outer contour 106 and the plane surface 109. The recess surface 117 of the recess 115 of the lever arm 11 moves across the outer contour 106 of the securing disk 10', as was already explained above. After the release position of the lever arm 11, the edge of the recess surface 117 touches the projection 108, whereby the movement across the plane surface 109 and thus the outer contour 106 is slowed down. An unintentional and sudden opening of the lever arm coupling is thus made impossible, because the force P presses the securing disk 10' and thus the plane surface 109 and the abutting projection 108 against the recess surface 117 of the lever arm and thus wedges it in response to a pressurized lever arm coupling. After an automatic or manual pressure release has been carried out, the movement of the lever arm 11 comprising the securing disk 10' can take place into the decoupling position.

LIST OF REFERENCE NUMERALS 1 lever arm coupling
2 first hose part
4 first connection part
40 insertion section (tapered)
41 rear side
42 peripheral groove (ring-shaped)
43 front side
5 second connection part
50 receptacle housing
500 receptacle space
501 housing wall (ring-shaped)
502 sealing ring
51 pivot bolt
52 radial opening
53 release stop
54 pressure release stop
55 locking stop
56 pressure release hole
57 pressure release pocket
10 securing disk
101 elongated hole
102 defining cam
103 release surface
104 detention cam
105 carry-along cam
106 outer contour
107 flat area
108 projection
109 plane surface
11 lever arm
111 cylindrical hole
112 pressure application section
114 pressure surface
115 recess
116 release point
117 recess surface
A second direction/counter-clockwise direction
B first direction/clockwise direction
P force

The invention claimed is:

1. A lever arm coupling for detachably connecting hose lines, comprising a first connection part and a second connection part to a sealing ring,
wherein the second connection part encompasses a receptacle housing comprising a receptacle space, on which at least one lever arm is supported so as to be moved pivotably about a pivot bolt, which defines a pivot axis, with a pressure application section reaching through a radial opening of a housing wall, so that the lever arm can be brought from a locking position via a pressure release position into a release position and back, wherein the pressure application section positionally fixes a front side of the first connection part in the locking position or positionally releases the front side in either the pressure release position or the release position, respectively,
wherein a securing disk is supported in a pivotable manner on the pivot bolt in an approximately parallel direction to the pressure application section and independent on the at least one lever arm, partially projects through the radial opening into the receptacle space and can be operatively connected to the first connection part, whereby the first connection part can be positionally fixed in a clamping manner in a secured pressure release position relative to the second connection part,
wherein the securing disk comprises an elongated hole, by means of which the securing disk is pivotably supported on the pivot bolt.

2. The lever arm coupling according to claim 1, wherein the securing disk comprises a detention cam, which is integrally molded on the securing disk such that the detention cam can be pressed in a clamping manner onto the front side of the first connection part by pivoting the securing disk when the first connection part is inserted into the receptacle housing, whereby the first connection part can be positionally fixed in a secured pressure maintaining or release position relative to the second connection part.

3. The lever arm coupling according to claim 1, wherein the securing disk is pivotable in a recess in the pressure application section of the lever arm and is supported so as to be movable by the pressure application section.

4. The lever arm coupling according to claim 3, wherein the securing disk is held by means of a positive connection of an outer contour of the securing disk with a recess surface of the recess in a linear and rotatively immovable manner.

5. The lever arm coupling according to claim 4, wherein the securing disk encompasses an outer contour, which interacts with the recess such that the recess surface of the recess of the pressure application section can move across the outer contour of the securing disk.

6. The lever arm coupling according to claim 5, wherein the outer contour encompasses a plane surface and a projection, which adjoins the plane surface, wherein one edge of the recess surface is held so as to move across the plane surface so as to strike the projection.

7. The lever arm coupling according to claim 1, wherein the maximum pivotability of the securing disk is defined in a first direction by integrally molded defining cams striking a pressure release stop integrally molded on the second connection part.

8. The lever arm coupling according to claim 1, wherein a carry-along cam, which is integrally molded to the securing disk, defines the maximum pivotability of the securing disk in a second direction by striking against a release stop.

9. The lever arm coupling according to claim 1, wherein the securing disk encompasses a release surface, which is oriented approximately parallel to the outer surface of the first connection part in response to the positioning of the at least one lever arm into the release position, so that the first connection part can be removed from the receptacle housing.

10. The lever arm coupling according to claim 1, wherein the elongated hole encompasses a curved course.

11. The lever arm coupling according to claim 1, wherein at least one pressure release hole is arranged with the housing wall permeating the receptacle housing in the area of the sealing ring.

12. The lever arm coupling according to claim 1, wherein at least one pressure release pocket is introduced into the edge of the housing wall in the area of the sealing ring.

* * * * *